(12) United States Patent
Damick et al.

(10) Patent No.: US 7,904,473 B2
(45) Date of Patent: Mar. 8, 2011

(54) COMMUNITY-BASED PARENTAL CONTROLS

(75) Inventors: Jeffrey Joseph Damick, South Riding, VA (US); Sean Cunningham, Washington, DC (US)

(73) Assignee: AOL Inc., Dulles, VA (US)

( * ) Notice: Subject to any disclaimer, the term of this patent is extended or adjusted under 35 U.S.C. 154(b) by 175 days.

(21) Appl. No.: 11/395,539

(22) Filed: Apr. 3, 2006

(65) Prior Publication Data
US 2006/0242309 A1    Oct. 26, 2006

Related U.S. Application Data

(60) Provisional application No. 60/759,033, filed on Jan. 17, 2006, provisional application No. 60/667,664, filed on Apr. 4, 2005.

(51) Int. Cl.
*G06F 17/30* (2006.01)
*G06F 15/16* (2006.01)

(52) U.S. Cl. .................. 707/781; 707/913; 707/914; 725/25; 725/28

(58) Field of Classification Search .................. 707/101, 707/781
See application file for complete search history.

(56) References Cited

U.S. PATENT DOCUMENTS

| | | | |
|---|---|---|---|
| 5,790,426 A * | 8/1998 | Robinson | 702/179 |
| 5,973,683 A * | 10/1999 | Cragun et al. | 715/719 |
| 7,461,051 B2 * | 12/2008 | Lavine | 707/3 |
| 2002/0156875 A1 * | 10/2002 | Pabla | 709/220 |
| 2003/0009495 A1 * | 1/2003 | Adjaoute | 707/501.1 |
| 2003/0028595 A1 * | 2/2003 | Vogt et al. | 709/204 |
| 2003/0046399 A1 * | 3/2003 | Boulter et al. | 709/228 |
| 2005/0081043 A1 * | 4/2005 | Evans et al. | 713/182 |
| 2005/0251399 A1 * | 11/2005 | Agarwal et al. | 705/1 |
| 2006/0041655 A1 * | 2/2006 | Holloway et al. | 709/223 |

* cited by examiner

*Primary Examiner* — Tony Mahmoudi
*Assistant Examiner* — Brittany N McCue
(74) *Attorney, Agent, or Firm* — Finnegan, Henderson, Farabow, Garrett & Dunner, LLP (57) ABSTRACT

According to a general aspect, a method includes maintaining rating groups, each rating group providing a rating for content compiled based on information received from a user evaluating the content. The method also includes receiving, from a first user, a selection of a first rating group, from among the rating groups, to be applied to a set of users associated with the first user. The method also includes receiving, from a user, a request for a piece of content from the content. The method also includes determining that the user from which the request was received belongs to the set of users associated with the first user. The method also includes, based upon the determination that the user belonged to the set of users associated with the first user, accessing information associated with the first rating group and determining whether the first rating group includes a rating for the requested piece of content. The method also includes determining whether or not to provide information to the requesting user conditioned on the indication or absence of a rating for the requested piece of content within the first rating group.

16 Claims, 8 Drawing Sheets

COMMUNITY-BASED PARENTAL CONTROLS

CROSS REFERENCE TO RELATED APPLICATION

This application claims priority to U.S. Provisional Application No. 60/759,033, filed Jan. 17, 2006 and titled "Community-Based Parental Controls," which is incorporated by reference. This application also claims priority to U.S. Provisional Application No. 60/667,664, filed Apr. 4, 2005 and titled "Internet Safety Device."

TECHNICAL FIELD

This disclosure relates in part to controlling access to content.

BACKGROUND

Users may access available content over the Internet through a network service provider. Some available content may be inappropriate for certain users. Accordingly, content is often rated to enable a determination of whether it is appropriate for given users.

SUMMARY

A user wanting to control network access to content from their home computer has a limited ability to determine whether a large amount of content is appropriate or inappropriate. Although other individual's judgments of appropriateness for some content may be available, the other individual's judgments may be to few in number or incompatible with the user's own view of appropriateness.

One described system enables a user to control network access to content by providing an ability to create, to join, and to apply content rating groups. The content rating groups include data useful in enabling a determination of the appropriateness or inappropriateness of individual pieces of content. Thus different content rating groups may judge or enable judgment of the appropriateness or inappropriateness of content differently. A user may select which rating group, among multiple rating groups, most accurately conforms to the user's own judgment concerning content, and the user may apply the selected rating group to future content delivered in response to content requests.

The claims listed at the end of this disclosure are to be considered part of the specification for all purposes, including providing support for any future claims.

The various aspects, implementations, and features may be implemented in a variety of manners, even if only described herein in, for example, a single manner. The various aspects, implementations, and features may be implemented using, for example, one or more of: a method; an apparatus; an apparatus for performing a method; a program or other set of instructions for performing one or more aspects, implementations, or features; an apparatus that includes a program or other set of instructions; a computer readable medium; or a propagated signal. The computer readable medium or propagated signal may include, for example, instructions, software, and other data. The various aspects, implementations, and features may also include additional components, such as, for example, a computer, a router, a server, or a peripheral device.

The details of one or more implementations are set forth in the accompanying drawings and the description below.

DETAILED DESCRIPTION

An Internet service provider enables a home personal computer to display Internet content. The Internet content may include content that one or more users of the home personal computer do not want to be made available to one or more other users of the home personal computer. Using technology described by this application, the user is made able to join or create a rating group in order to block access to such content by others.

In one implementation, the rating groups allow members to vote on whether or not pieces of content should be blocked. Because multiple members may vote on content, a large amount of content may be rated. A rating group may be specific to a group of individuals with certain interests or beliefs. A user may create their own rating group and their own preferences as to who may join and who may vote. Multiple rating groups may be joined concurrently by a user.

After joining one or more rating groups, requested content deemed inappropriate by the rating groups may be blocked. If a piece of content is requested by the home personal computer, the network access provider searches joined rating groups to determine if a rating has been assigned by any of the joined rating groups to that piece of content. If no rating has been assigned, the network service provider may or may not enable access to the requested content. If ratings exist in multiple joined rating groups, the network service provider may consult one or more of these ratings in determining whether to block or grant access to the content. In one example, for instance, the network service provider may be configured to utilize a hierarchal system to determine which rating to utilize, and thereafter, the network service provider may consult the rating to block or grant access to the content.

Figure 1:
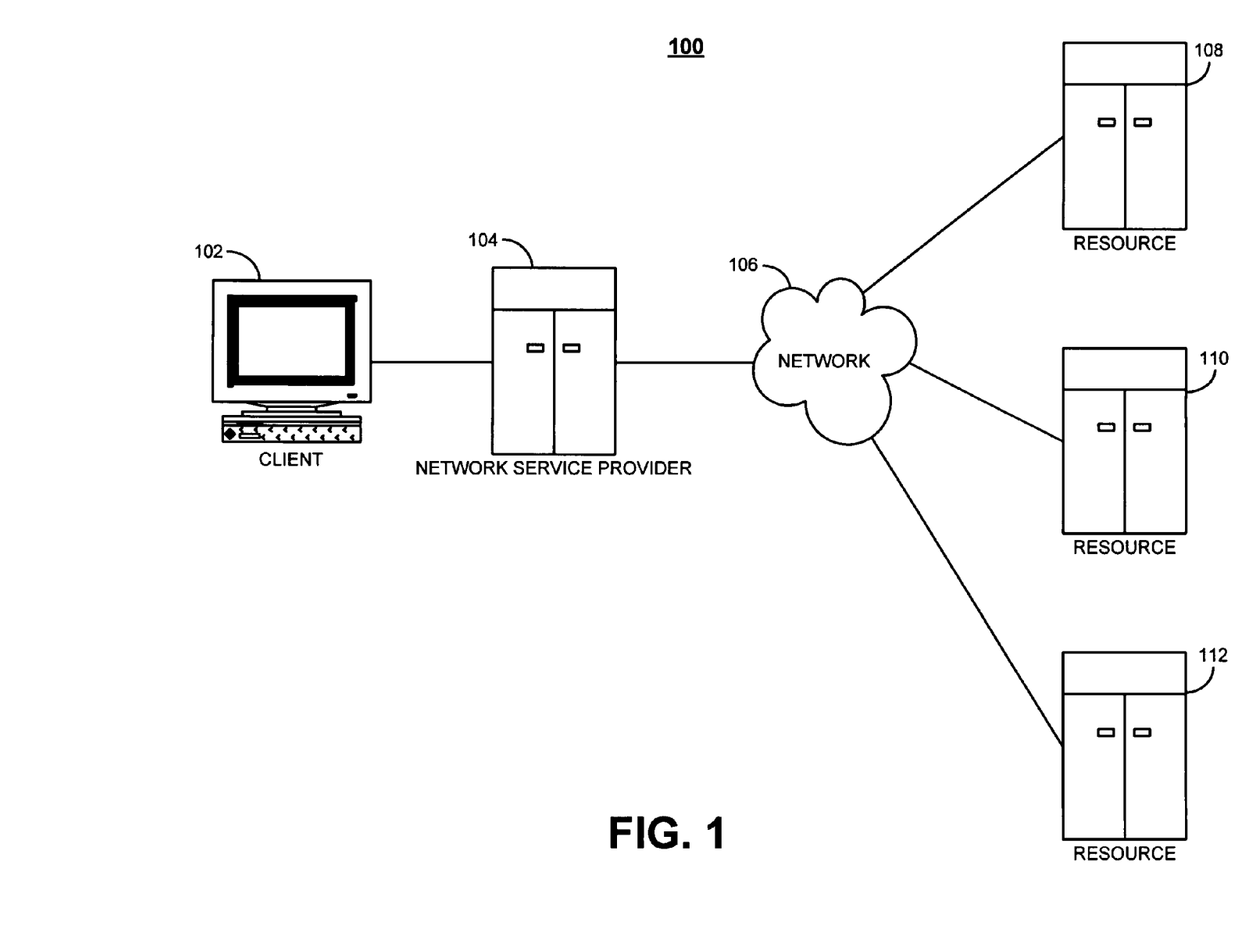
FIG. 1 illustrates an exemplary system for providing network access control.

Referring to FIG. 1, a system 100 is configured to provide network communication and content access according to one or more of the methods described below. System 100 includes a client 102 coupled to a network service provider 104 that is coupled to a network 106. The network 106 also is coupled to various resources 108-112.

The client 102 may include devices with which the user interacts in order to send a request for content. For example, the client 102 may be a personal computer, a laptop, a cell phone, or a personal data assistant. The client 102 also, or alternatively, may include an application, software, or instructions, with which a user interacts in order to send a request for content. The client 102 may communicate with the network service provider 104 through one or more of various methods, such as wireless networking or Ethernet cable. The network service provider 104 may include, for example, a router or a server, and may be utilized to link multiple clients 102 to the network 106. The network service provider 104 may include parental controls by filtering requests for content with content ratings groups as described in FIGS. 2-7C to restrict content access by the user. The network 106 may include, for example, the Internet, and is coupled to various resources 108-112. The resources are providers of content. Content can include various types of information, such as, for example, a webpage, a downloadable file, an email, or a message-board.

Figure 2:
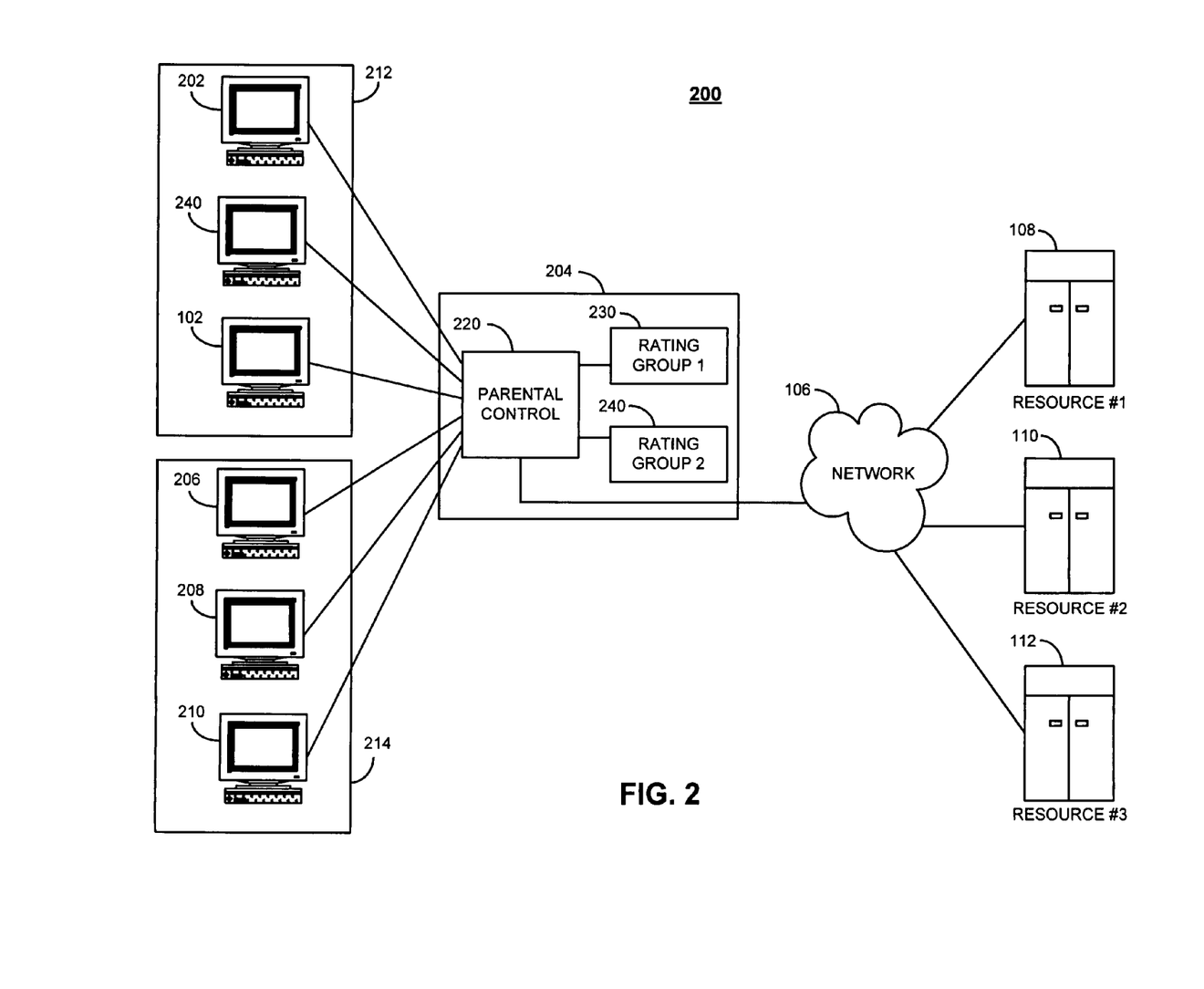
FIG. 2 illustrates an exemplary system for providing network access control.

Referring to FIG. 2, a system 200 is configured to provide network communication. System 200 includes voting clients 212 and using clients 214 coupled to a network service provider 204 that is coupled to a network 106.

The voting clients 212 are users that are enabled to submit votes towards the rating of content within a rating group. The voting clients 212 include client 102 as well as clients 202 and 204. The using clients 214 are users that are enabled to use the rating of content within a rating group. The using clients 214 include clients 206-210. The voting and using clients 212-214 may communicate with the network service provider 204 through various methods, such as wireless networking or Ethernet cable. A given client may be both a voting client 212 and a using client 214.

The network service provider 204 may include parental controls to restrict content access by the user. The network service provider 204 includes a parental control unit 220 that maintains a plurality of rating groups 230-240 utilized to determine whether to provide access to resources 108-112 to the using clients 214. The rating groups 230-240 include ratings information indicating the rating of content. When a using client 214 which is a member of one or more rating groups 230-240 requests access to resources 108-112, the parental control unit 220 utilizes ratings within the rating groups 230-240 to determine whether to provide access to the requested resources 108-112.

For example, rating group #1 230 is an open community group, in which any client 102 meeting certain characteristics may provide ratings. Rating group #2 240 is a closed community group, in which only specifically identified clients may provide ratings. The words "open" and "closed" are merely exemplary, and indicate some of the variation group membership may have. For example, group members may be specifically identified by the group creator and unchanging, group members may be limited to those clients that satisfy one or more specified characteristics/qualifications, or anyone may be allowed to join a group. Information directed toward the rating of content may be collected in various ways. For example, information directed toward the rating of content may be collected from a single user, may be collected from only voting clients 212, may be open to collection from all clients, or may be extracted from a database of ratings.

The previous description is an example implementation of the system 200 for providing network communication and other or different elements may be included. For example, the rating groups 230-240 may be stored on one of the resources 108-112 and may be updated independently of the network service provider 104.

Figure 3:
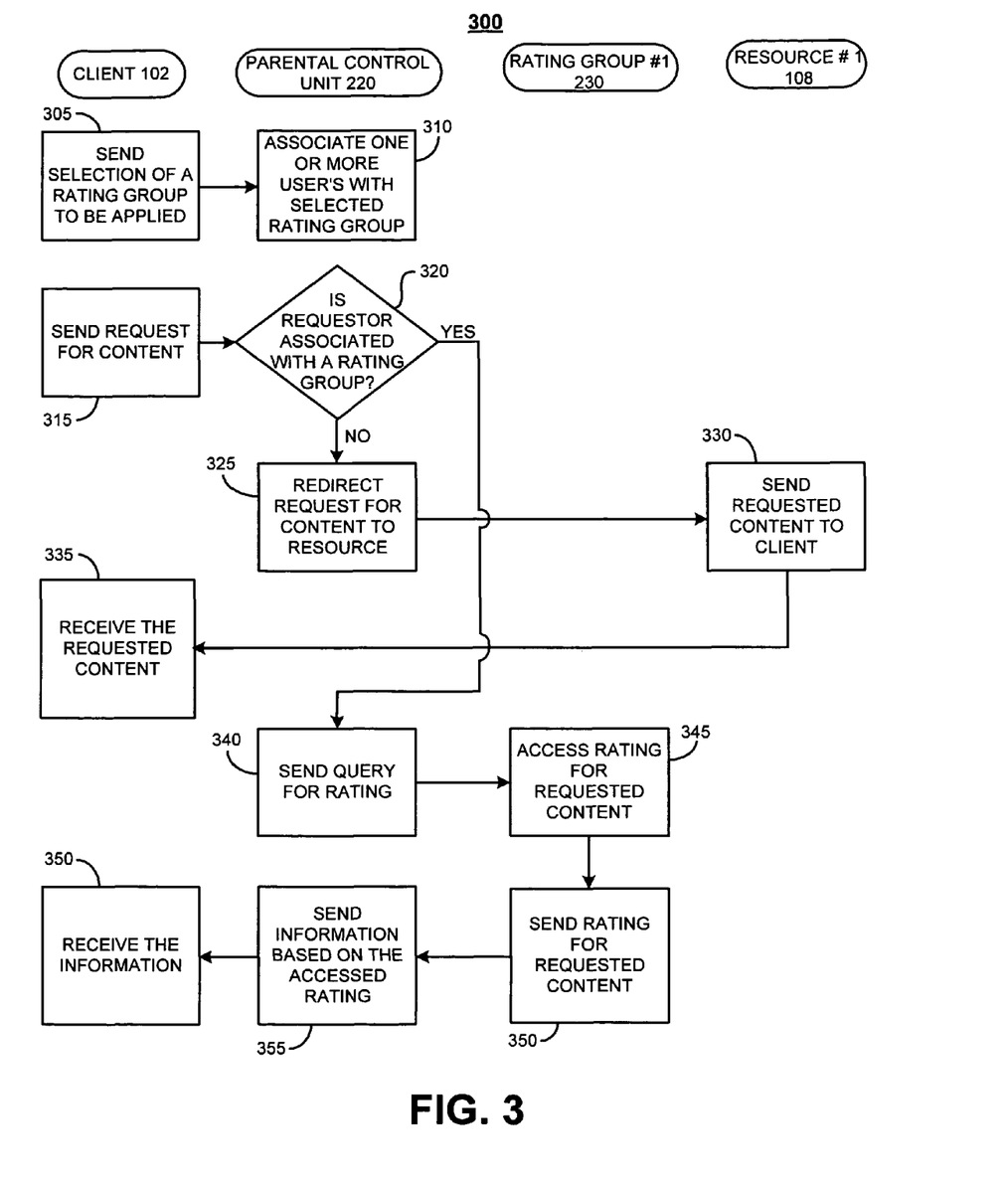
FIG. 3 illustrates an exemplary process for selecting and using a rating group.

Referring to FIG. 3, a process 300 is illustrated for selecting and applying a rating. The process 300 may be used in conjunction with the system 200 of FIG. 2 and the discussion below describes the process 300 in the context of the system 200. However, other systems may be used.

The process 300 includes a sub-process for processing a selection of a rating group. The sub-process begins when a using client 214, such as client 102, selects a rating group to be applied (305). The selection may include specification of an open 230 or a closed 240 rating group, although FIG. 3 is illustrated for an open group 230. The parental control unit 220 receives the selection and associates one or more users with the selected rating group (310). Associating one or more users may include storing information identifying the client 214 that directs the parental control unit 220 to refer to at least that rating group when a using client 214 sends a request for content. The information identifying the client 214 may be stored in a table, and be linked to the appropriate rating group. Alternatively, the information identifying the client 214 may be stored in the rating group, and the rating groups may be accessed and searched to determine which rating group a particular client is associated with.

Process 300 includes another sub-process for processing a request for content. The sub-process includes the client 102 sending a request for content (315). The request for content may be for any, for example, Internet based content, such as, for example, a webpage, a downloadable file, an email, or a message-board. The parental control unit 220 receives the request for content which prompts the parental control unit 220 to determine if the client 102 is associated with a rating group (320).

If the client 102 is determined, in operation 320, to not be associated with a rating group 230-240, the parental control unit 220 redirects the request for content to the resource 108 over the network 106 (325). The resource 108 receives the request for content and sends the requested content to the client 102 over the network 106 (330). The client 102 then receives the requested content (335).

If the client 102 is determined to be associated with a rating group in operation 320, the parental control unit 220 sends a query for the rating of the content to the open rating group 230 (340). The open rating group 230 accesses the rating for the requested content (345), and the open rating group 230 sends the rating for the requested content to the parental control unit 220 (350). The parental control unit 220 receives the rating for the requested content. Utilizing information stored about the client 102 and the received rating for the requested content, the parental control unit 220 determines and sends information based on the accessed rating to the client 102 (355). The information based on the accessed rating indicates whether the requested access to some or all of the content is, or is not, to be granted. For example, the information may include: the rating itself, the requested content (in which case the parental control unit 220 simply serves the content requested, e.g., if it satisfies the parental controls), a "blocked" display, or non-displayed information indicating that the content will not be provided. The client 102 receives the information based on the accessed rating (360).

The previous description is an example implementation of the process 300 of selecting and applying a rating, and other or different operations may be included. In some implementations, when the resource 108 receives the request for content and sends the requested content to the client 102 over the network 106 (330), the resource 108 may send the requested content to the client 102 through the parental control unit 220 where additional information is used in order to determine the information to the client (355). For example, the ratings groups 230-240 may utilize other rules to determine whether to block a request. Other rules may include automatically denying requests in which certain words or phrases are present in the requested content. The words or phrases may be kept in a content ratings group list which may be open or closed to editing by group member.

Also, if no rating is found for the requested content, the network access provider may or may not provide access to that content.

Figure 4:
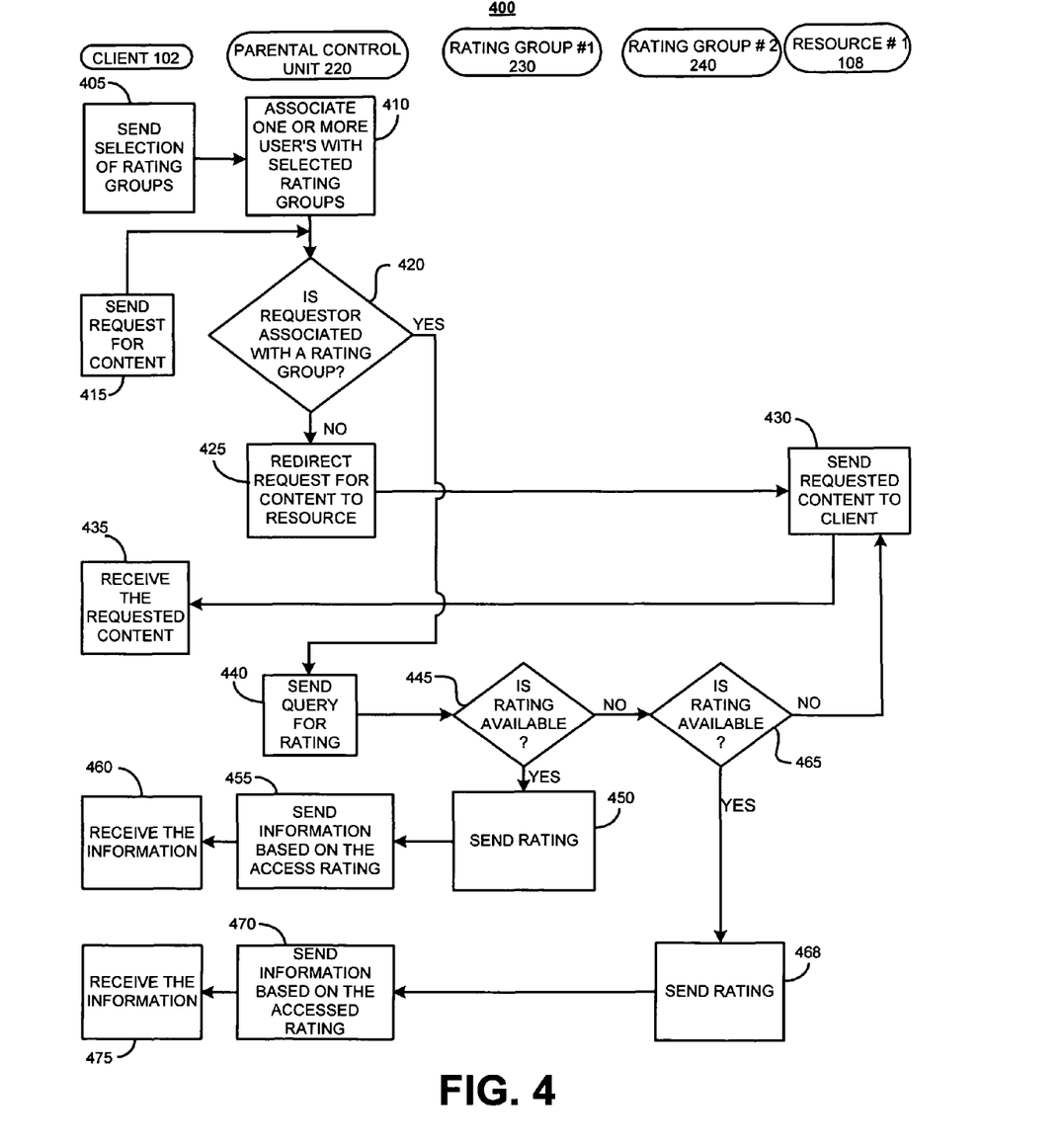
FIG. 4 illustrates an exemplary process for selecting and using multiple rating groups.

Referring to FIG. 4, process 400 is shown to illustrate selecting multiple rating groups and applying content ratings that are established by one or more of the multiple rating groups for requested content. The process 400 may be used in conjunction with the system 200 of FIG. 2 and the discussion below describes the process 400 in the context of the system 200. However, other systems may be used.

The process 400 includes a client 102 that enables a selection of multiple rating groups to be applied to content requests (405). The selection may include specification of an open 230 or a closed 240 rating group and includes one primary rating group (shown in FIG. 4 as rating group 230) and one or more secondary rating groups (FIG. 4 shows one secondary rating group of rating group 240). The user may be allowed to designate the primary and secondary rating groups, or such designation may be made by, e.g., the parental control unit 220. As explained below, the primary rating group is the rating group that is first accessed by the parental control unit 220 in order to select a rating for particular requested content. If the primary rating group does not include a rating for the particular requested content, the parental control unit 220 applies a rating established by the secondary rating group. The parental control unit 220 receives the selection and associates one or more users with the selected rating groups (410). Associating one or more users may include storing information in the rating groups that directs the parental control unit 220 to refer to those rating groups when the user sends a requests for content.

The process 400 includes the client 102 sending a request for content (415). The request for content may be for any, for example, Internet based content, such as, for example, a webpage, a downloadable file, an email, or a message-board. The parental control unit 220 receives the request for content which prompts the parental control unit 220 to determine if the client 102 is associated with a rating group (420).

If it is determined in operation 420 that the client 102 is not associated with a rating group 230-240, the parental control unit 220 redirects the request for content to the resource through the network 106 (425). The resource 108 receives the request for content and sends the requested content to the client 102 (430) through the network 106. The client 102 then receives the requested content (435).

If it is determined in operation 420 that the client 102 is associated with a rating group, the parental control unit 220 sends a query for a rating of the requested content to the primary open rating group 230 (440). The primary open rating group 230 determines whether a rating for the requested content is established by the primary open rating group 230 (445).

If it is determined in operation 445 that a rating for the requested content is established by the primary open rating group 230, the rating established by the primary open rating group 230 is sent to the parental control unit 220 (450). The parental control unit 220 receives the rating for the requested content. Using information stored about the client and the received rating for the requested content, the parental control unit 220 determines and sends information for example, as discussed with respect to operation 355, based on the accessed rating to the client 102 (455). The information based on the accessed rating indicates whether some or all of the requested content is or is not to be blocked, and may include information detailing a lack of stored rating for the requested content. The client 102 receives the information based on the accessed rating (460).

If it is determined in operation 445 that a rating for the requested content is not established by the primary rating open group 230, process 400 determines whether a rating for the requested content is established by the secondary closed rating group 240 (465). If it is determined in operation 465 that a rating for the requested content is established by the secondary closed rating group 240, then the rating is sent to the parental control unit 220 (468).

A user may set up multiple rating groups to be applied in a specified, or hierarchical, order. For example, as indicated in FIG. 4, a first rating group 230 is searched for a rating for particular content. If a rating is not found, then a second closed rating group 240 is searched. Tertiary, and further, rating groups may also be designated by, for example, a user. Additionally, the decision at any point in the hierarchy may require input from multiple rating groups. Moreover, if multiple secondary rating groups are associated with the user (not shown), each of the multiple secondary rating groups may be accessed to determine a rating for the requested content, and the ratings may be combined to form a final rating. The combination may include, for example, taking an average or a median or using some other mathematical or logical operation.

Process 400 includes the parental control unit 220 receiving the rating for the requested content, using information stored about the client and the received rating to determine information based on the accessed rating, and sending the information to the client 102 (470). The information based on the accessed rating indicates whether the requested access to some or all of the content is or is not to be granted. The client 102 receives the information based on the accessed rating (475).

If it is determined in operation 465 that a rating for the requested content is not established by the secondary closed rating group 240, the requested content is sent to the client 102 (430). Other implementations, however, may block the requested content.

The previous description is an example implementation of the process 400 of selecting and applying a rating, and other or different operations may be included. For example, multiple hierarchies of ratings groups beyond a primary and secondary may be employed. Further, selected ratings may be based on all available ratings, such as, for example, by selections the most common rating for the requested content from among the available ratings.

Figure 5:
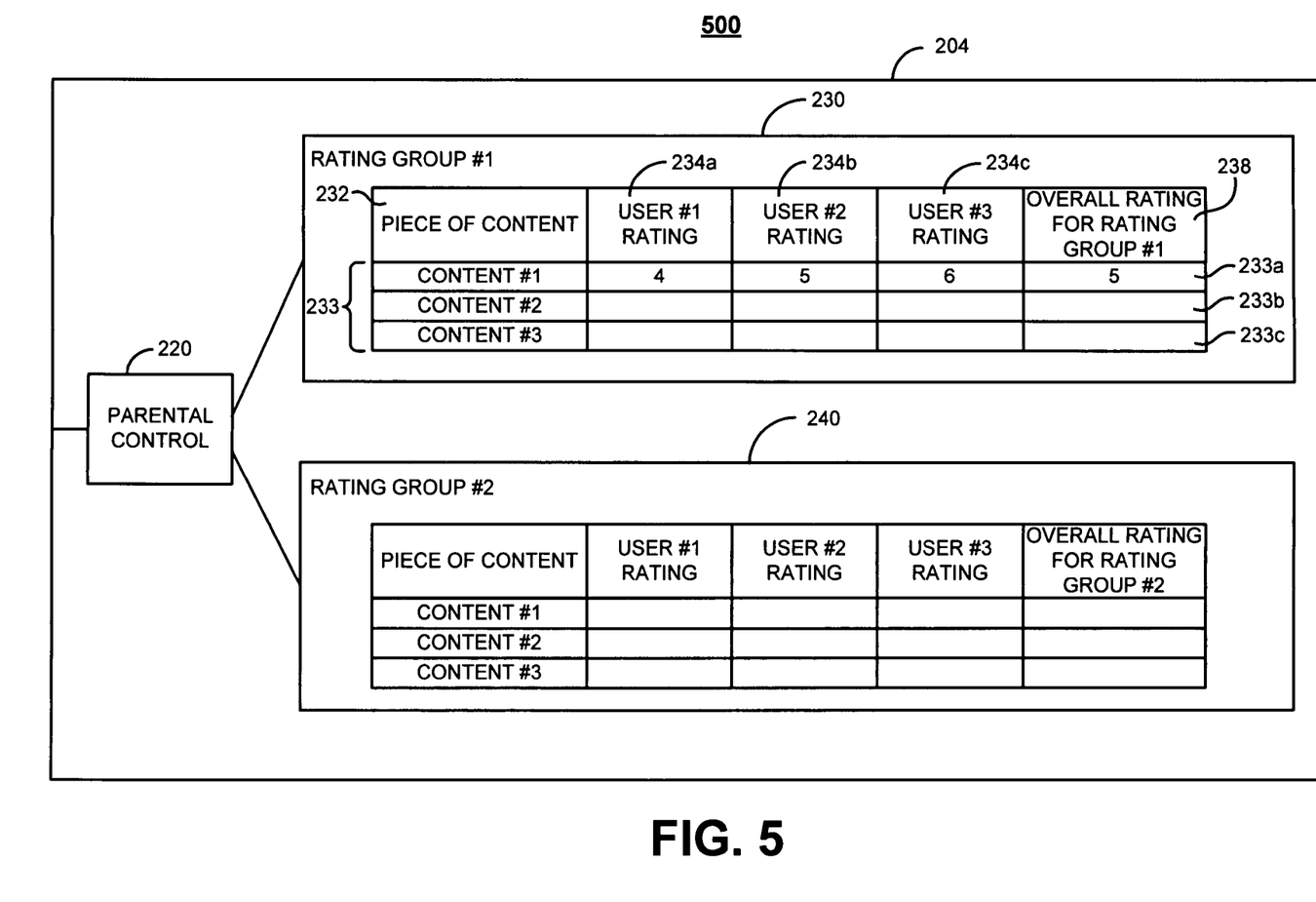
FIG. 5 illustrates an exemplary network service provider for maintaining multiple rating groups.

Referring to FIG. 5, system 500 includes the network service provider 204, which includes a parental control unit 220, and compiled ratings for a first open rating group 230 and a second closed rating group 240.

The first open rating group 230 includes various categories such as a content category 232 describing a piece of content, several user rating categories 234a-c, and an overall rating category for the rating group 238. The first rating open group 230 includes three entries 233, organized as three rows 233a-c. An entry for the content category 232 in the first row 233a is listed as "Content #1" and includes descriptive information, including, for example, the piece of content's location. The user rating entries 234a-c for the first row 233a are listed as 4, 5, and 6, respectively, and the overall rating 238 is listed as 5 which is an average value.

The first open rating group 230 also may include weights (e.g. between zero and one, inclusive) for each of the user rating categories 234a-c, which weighting may be the same or different. In the example shown in FIG. 5, each of the user rating categories 234*a-c* are weighted equally. In another example, user rating category 234*a* may be weighted twice as much as user rating categories 234*b-c*, which would produce an overall rating 238 of 4.75.

Weights may vary based on, for example, the authority, the judgment, the position, or the trustworthiness of the user contributing the ratings. An individual that created the first rating open group 230, or individuals satisfying all of the desirable characteristics of rating contributors, or particularly designated individuals (e.g. the nuclear members of a family), may be given higher weights. For example, rules may direct users that have been members for a given amount of time or are more active, may be given more weight than less active or newer members. Also, a member which consistently votes against the majority or members who consistently vote to allow all content may be given less or no weight.

The previous description is an example implementation of the system 500 including a network service provider and compiled rankings. Other implementations may be organized differently and may include different or fewer elements. The value of the overall rating 239 may be computed by a method other than averaging each individual value for the entry ratings 236. For example, weights as described above may be associated with each vote and included in the computation. Also, non-linear computations or regression of weights or votes, such as where larger deviations are minimized (e.g. "least squares" or quadratic), may be included to minimize the effect of votes that are significantly different than the majority.

Figure 6:
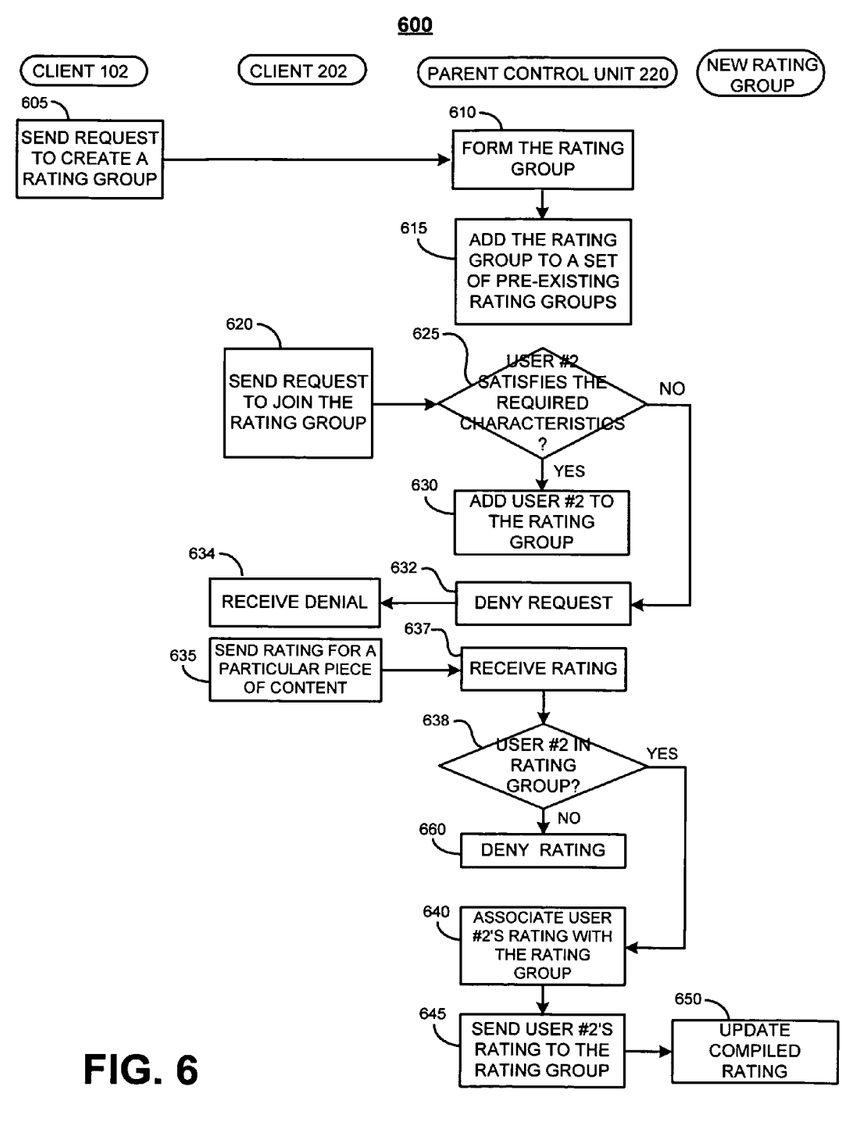
FIG. 6 illustrates an exemplary process for creating a rating group and compiling ratings.

Referring to FIG. 6, process 600 enables creation of a rating group and compilation of ratings. The process 600 may be used in conjunction with the system 200 of FIG. 2 and the discussion below describes the process 600 in the context of the system 200. However, other systems may be used.

The process 600 includes a client 102 sending a request to create a rating group (605). The request includes characteristics associated with the rating group. The parental control unit 220 receives the request to create the rating group and also receives the characteristics associated with the request for the rating group. The associated characteristics are used by parental control unit 220 to determine properties of the rating group such as, for example, whether the rating group is open or closed, the method of vote computation to determine overall ratings for content, and the requirements needed for a user to join the rating group. A closed group may, for example, only enable users of certain names or characteristics to join. The parental control unit 220 forms the rating group (610), and the rating group is added to a set of previously established rating groups (615).

Process 600 includes a separate sub-process for processing a request to join the new group. The sub-process includes a client 202 sending a request to the parental control unit 220 to join the rating group on behalf of user #2 (620). The parental control unit 220 receives the request and verifies that user #2 satisfies the required characteristics of the rating group (625).

If user #2 satisfies the required characteristics of the rating group, user #2 is added to the rating group (630). If user #2 does not satisfy the required characteristics of the rating group in operation 625, then user #2's request to join the rating group is denied by the parental control unit 220 (632), and the denial is received by the client 202 (634).

Process 600 includes another separate sub-process for receiving and processing a rating. The sub-process includes the client 202 sending a rating for a particular piece of content on behalf of user #2 to the parental control unit 220 (635). The parental control unit 220 receives the rating (637), and determines whether user #2 belongs to the rating group (638). If user #2 belongs to the rating group, then the parental control unit 220 associates user #2's rating with the rating group (640). Associating a rating with a rating group may include weighting the user #2 rating to an appropriate value. Further, the overall rating for the particular piece of content is updated and compiled (650). If user #2 does not belong to the rating group, then the parental control unit 220 denies the rating submission from user #2 (660).

The previous description is an example implementation of the process 600 of creating a rating group and compiling ratings, and other or different operations may be included. For example, an open rating group 230 could be created that has no required characteristics, or in which there are desired characteristics that are not enforced.

Implementations may also allow a rating group to be provided by a third party, such as, for example, a recognized group with a known ideology. Users may prefer to select such a known rating group as, for example, one of several hierarchically organized rating groups. Depending on various factors, such as the availability of ratings from such known rating groups, users may be charged a fee for access to ratings from the known rating group. Implementations may also allow users to contribute ratings to the known rating group, perhaps requiring that these users meet various qualifications or pay a fee.

Implementations may also provide an administrative user in a rating group, with privileges beyond the privileges extended to other users that are members of the rating group. For example, the administrative user may be required to approve or reject (1) all (or some, e.g., based on designated criteria) users before those users are allowed to become members of the rating group, (2) all ratings of content (or some, e.g., ratings of particular content) from members, (3) all compiled ratings of content, wherein the compiled ratings are compiled from the member's ratings, or (4) only specific compiled ratings, such as, for example, ratings that indicate that content is suitable for all audiences.

Other implementations do not explicitly require a user to join a rating group in order to rate content. One implementation allows a user to identify itself and to submit content ratings. These rating are made available as a rating group. Thus, for example, a user #1 may notice that a user #2 has submitted various ratings. If user #1 trusts the ratings of user #2, then user #1 may designate user #2 as a rating group to be applied as access control to content requests from user #1 (or from other users, for example, under the supervision of user #1). Further, user #1 may notice that multiple users have submitted ratings, and if user #1 trusts all of the multiple users, then user #1 may designate that an average (for example) be taken over the ratings of all of the multiple users, and this average may then be applied as an access control rule for content requests from user #1 (or from other users, for example, under the supervision of user #1).

As is evident from the breadth of the disclosure, implementations, features, and techniques described herein, as well as variations or combinations of them, may be implemented at least in part, for example, in an operating system or in a stand-alone application or utility, running on one or more of a variety of devices. Such devices may include, for example, a personal computer, a server, a router, a gateway, or a special-purpose computer or machine. Moreover a device may also include, for example, discrete or integrated hardware, firmware, and software. A device may include, for example, a processor, which refers to processing devices in general, including, for example, a microprocessor, an integrated circuit, a programmable logic device, and a device containing a software application.

Such a device may be configured to perform one or more processes. For example, implementations may be embodied in a device that includes one or more computer readable media having instructions for carrying out one or more processes. The computer readable medium may include, for example, a storage device such as, for example, a hard disk, a compact diskette, a random access memory ("RAM"), and a read-only memory ("ROM"). A computer readable medium also may include, for example, formatted electromagnetic waves encoding or transmitting instructions. Instructions may be, for example, in hardware, firmware, software, and in an electromagnetic wave. Instructions may be found in, for example, an operating system, a separate application, or a combination of the two. A processor may be, for example, both a device configured to carry out a process and a device including computer readable media having instructions for carrying out a process.

Figure 7A:
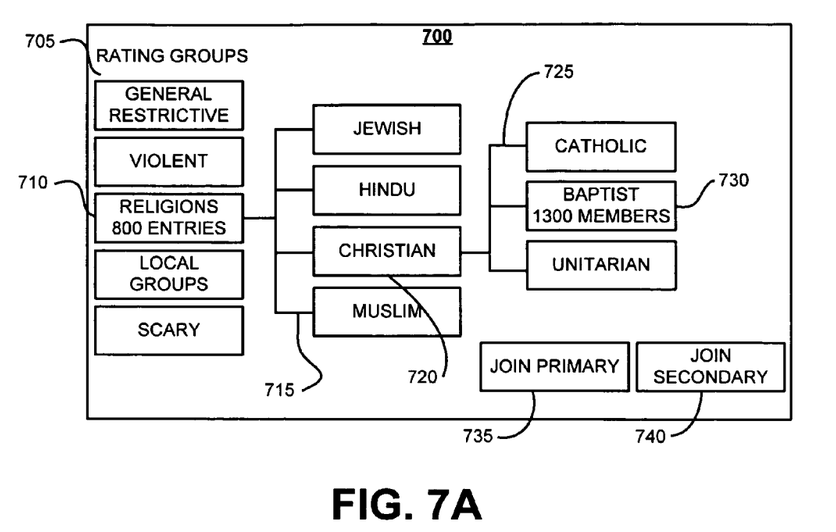
FIG. 7A illustrates an exemplary graphical user interface of a hierarchal ratings group selection screen.

Referring to FIG. 7A, an exemplary graphical user interface (GUI) of a hierarchal ratings group selection screen 700 includes main entries 705 that may contain one or more levels of sub-category entries 715 and 720 and group selection options 735 and 740.

The GUI 700 enables a user to browse and select ratings groups through a hierarchal selection process. The top level 705 displays general categories of ratings groups. The main entries 705 include a title, such as the religions entry 710, that describes the nature of the material that is rated. Each of the main entries 705 may include the number of ratings groups that are sub-categories to the entry. The religions entry 710 and the included sub-categories 715 and 725 include ratings that are adapted to user preferences based on a religious motivation, and may or may not include ratings based on other motivations. For example, a ratings group within the religions entry 710, may deny a request for blasphemous subject matter, but may not deny a request for violent subject matter.

Located within the religions entry 710 are multiple religions sub-categories 715, such as Christian 720. The Christian sub-category entry 720 includes three further sub-category entries 725. The Baptist entry 730 is a sub-category of the Christian entry 720 and includes ratings that are adapted to user preferences based on a christian religious motivation, and in particular, based on a Baptist motivation. The Baptist entry 730 includes the number of group members (shown as 1300) and may include the number of voting member (not-shown).

The selection option 735 and 740 enable a user to select a ratings group and include a "join primary option" 735, and a "join secondary option" 740. The "join primary option" 735 enables a user to specify a chosen rating group as the primary rating group. The "join secondary option" enables a user to specify a chosen rating group as a secondary rating group.

In one implementation, entries that are higher in hierarchy than a sub-category entry are separate ratings groups that function independently of the sub-category entries. In another implementation, entries that are higher in hierarchy than a sub-category entry may include a ratings group that include rating votes of the sub-categories. The ratings votes of the sub-categories may by included in various ways. For example, the religions entry 710 may deny any request that would be denied by any of the sub-category entries 715. Also, the religions entry 710 may deny any request that would be denied by all or a combination of the sub-category entries 715. Further, the religions entry 710 may calculate an average or weighted average of the sub-category entries 715 ratings to determine whether to deny a request.

The previous description illustrates one of various implementations of a ratings group selection screen. Other implementations may be organized differently and may include different or fewer elements. For example, the entries may be organized in a non-hierarchal order, such as alphabetically.

Figure 7B:
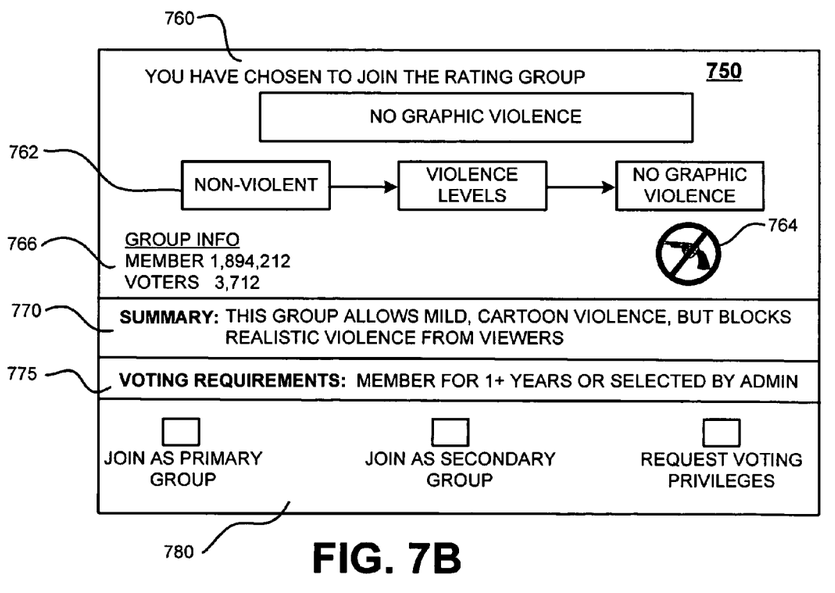
FIG. 7B illustrates an exemplary graphical user interface of a ratings group options screen.

Referring to FIG. 7B, a GUI of a ratings group information screen 750 includes a detailed group information section 760, a group summary section 770, a group voting requirements section 775, and a group options section 780.

The detailed group information section 760 includes information detailing information about the ratings group and includes a group hierarchal order 762, a descriptive icon 764, and a group statistics section 766. The group hierarchal order 762 details the location, within a group hierarchy, of the selected ratings group. The descriptive icon 764 includes a picture that illustrates the subject matter the ratings groups is directed to. The group statistics section 766 includes information such as the number of current members and the number of voting members.

The group summary section 770 includes a written summary of the subject matter allowed or denied by the group. For example, the written summary may specify that one subject matter is allowable while another subject matter is blocked.

The voting requirements section 775 includes a written description of the requirements of members to vote on content ratings. For example, a voting requirements section 775 may detail a length of time required by members and/or whose approval is necessary to be able to vote.

The group options section 780 includes options directed to the group that may be selected. For example, the options may include joining the group as a primary or secondary group, or requesting voting privileges for the group.

The previous description illustrates one of various implementations of a ratings group information screen. Other implementations may be organized differently and may include different or fewer elements. For example, contact information for group administrators may be included in the detailed group information section 760.

Figure 7C:
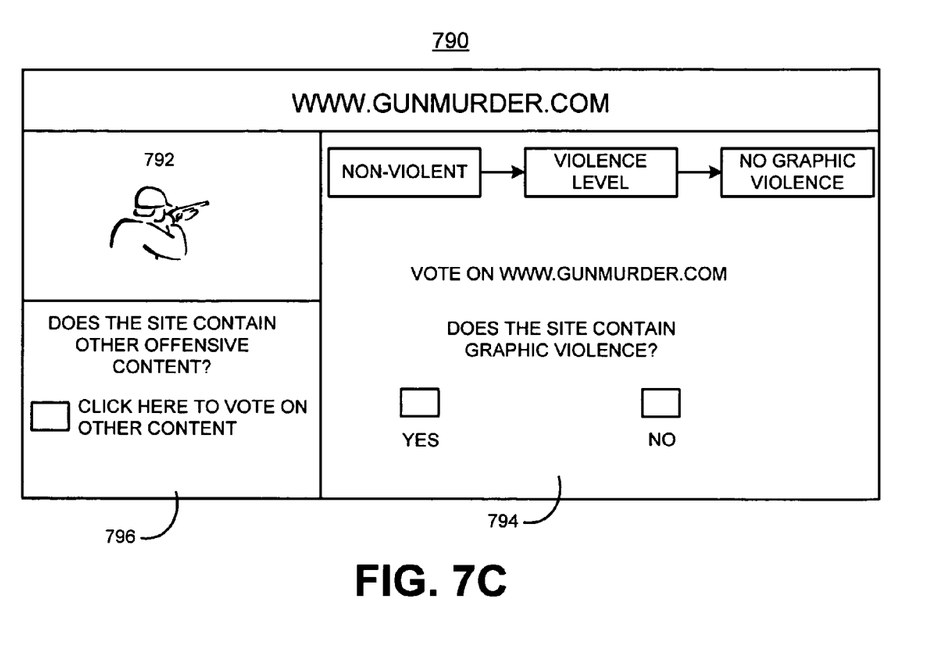
FIG. 7C illustrates an exemplary graphical user interface of a vote submission screen.

Referring to FIG. 7C, a GUI of a vote submission screen 790 includes a content snapshot 792, a main voting option 794, and a secondary voting option 796. The content snapshot 792 includes an illustration or screenshot of the content the vote is directed to. The screenshot may be, for example, a screenshot of a website or a still shot of a multimedia file. The main voting option 794 enables the user to submit a vote directed to a piece of content. The vote may be, for example, whether the content includes a graphic violence. The secondary voting option 794 enables users to submit votes concerning characteristics that may be related to other ratings groups. The secondary vote may be, for example, whether the content includes nudity or adult language.

The previous description illustrates one of various implementations of a vote submission screen. Other implementations may be organized differently and may include different or fewer elements. For example, the main voting option 794 may include a vote of a number between 1-10 instead of a 'yes' or 'no.' Also, the main voting option 794 may have multiple voting option per submission that may adapt to received response. For example, if a user submits a 'yes' response designating the content includes graphic violence, a more detailed question may be presented, such as, "how graphic on a scale of 1-10 is the violence in the subject matter?"

A number of implementations have been described. Nevertheless, it will be understood that various modifications may be made. For example, elements of different implementations may be combined, supplemented, modified, or removed to produce other implementations. Further, various technologies may be used, combined, and modified to produce an implementation. Accordingly, other implementations are within the scope of the following claims.

What is claimed is:

1. A computer-implemented method comprising:

maintaining, on one or more computer-readable storage devices, a plurality of different rating groups, each rating group providing a rating that relates to at least one piece of electronic content and that is compiled based on information received from a plurality of guardians evaluating the at least one piece of electronic content;

receiving, from a first guardian, a selection of at least first and second rating groups to apply to a set of users associated with the first guardian to control access to electronic content by the set of users;

receiving a request for a piece of electronic content from a user;

determining whether the user from which the request was received is within the set of users associated with the first guardian;

in response to a determination that the user is within the set of users associated with the first guardian, accessing information associated with the first and second rating groups from the one or more computer-readable storage devices;

determining, using a processor, whether or not to provide access to the requested piece of electronic content to the user based on an indication or absence of a compiled rating for the requested piece of content within the first and second rating groups, whereby access to the requested piece of content is denied based on the compiled rating for the requested piece of content that exists within at least one of the first and second rating groups, the complied rating within the second rating group being applied when there is the absence of a compiled rating for the requested piece of content in the first rating group;

receiving a request to form a new rating group and an identification of required characteristics for the new rating group;

forming the new rating group based on the request;

adding the new rating group to the maintained rating groups;

receiving a request from a second guardian to submit, to the new rating group, information evaluating content to enable control of content accessed by users;

verifying that the second guardian satisfies the required characteristics; and enabling the second guardian to submit the information evaluating content based on the verification that the second guardian satisfies the required characteristics.

2. The method of claim 1, wherein the maintaining of the plurality of rating groups comprises:

receiving, from the plurality of guardians, information evaluating reflecting an evaluation of electronic content; and compiling ratings for each rating group based on the evaluation information received from the plurality of guardians.

3. The method of claim 2, wherein the ratings are compiled based on weighting the information received for a given piece of electronic content.

4. The method of claim 1, further comprising:

receiving evaluation information evaluating the piece of electronic content from the second guardian;

associating the received evaluation information evaluating the piece of electronic content with the new rating group; and updating at least one compiled rating of the new rating group to reflect the information evaluating the piece of electronic content received from the second guardian.

5. The method of claim 4, further comprising:

receiving information evaluating the piece of electronic content from a third guardian;

associating the received information evaluating the piece of electronic content from the third guardian with the new rating group; and updating at least one compiled rating of the new rating group to reflect the information evaluating the piece of electronic content received from the third guardian.

6. The method of claim 5, wherein updating the at least one compiled rating to reflect the evaluation information evaluating the piece of electronic content received from the third guardian comprises weighting the information evaluating the piece of electronic content received from the third guardian differently than the information evaluating the piece of electronic content received from the second guardian.

7. The method of claim 1, wherein determining whether or not to provide the requested piece of electronic content to the user includes determining to block at least a portion of the requested piece of electronic content to the user based on the compiled rating.

8. The method of claim 1, further comprising providing the compiled rating to the user.

9. The method of claim 1, further comprising providing the requested piece of content to the user.

10. The method of claim 1, further comprising providing an indication to the user that the requested content is blocked.

11. The method of claim 1, wherein accessing information associated with the first rating group includes accessing guardian ratings of the first rating group.

12. A computer-implemented method comprising:

maintaining, on one or more computer-readable storage devices, a plurality of different rating groups, each rating group providing a rating that relates to at least one piece of electronic content and that is compiled based on information received from a plurality of guardians evaluating the at least one piece of electronic content;

receiving, from a first guardian, a selection of a first rating group as a primary rating group and a second rating group as a secondary rating group, from among the plurality of different rating groups, to be applied to control access to electronic content by a set of users associated with the first guardian;

receiving a request for a piece of electronic content from a user;

determining whether the user from which the request was received belongs to the set of users associated with the first guardian;

in response to a determination that the user belongs to the set of users associated with the first guardian, accessing information associated with the first and second rating groups from the one or more computer-readable storage devices;

determining, using a processor, whether or not a compiled rating exists for the requested piece of content within the first rating group;

in response to the determination that there is no compiled rating for the requested piece of content within the first rating group, analyzing information associated with the second rating group and determining whether or not a complied rating exists for the requested piece of content with the second rating group, wherein access to the requested piece of electronic content is denied when the compiled rating for the requested piece of content is determined to exist within the second rating group; and receiving a request to form a new rating group and an identification of required characteristics for the new rating group;

forming the new rating group based on the request;

adding the new rating group to the maintained plurality of rating groups;

receiving a request from a second guardian to submit, to the new rating group, information evaluating content to enable control of content accessed by a set of users associated with the second guardian;

verifying that the second guardian satisfies the required characteristics; and enabling the second guardian to submit the information evaluating content based on the verification that the second guardian satisfies the required characteristics.

13. The method of claim 12, further comprising granting access to the requested piece of electronic content when there is an absence of a guardian rating for the requested piece of content in both the first and second rating groups 14. The method of claim 12, further comprising blocking access to at least a portion of the requested piece of electronic content based on an indication of the compiled rating in at least one of the first and second rating groups.

15. The method of claim 12, further comprising providing the compiled rating to the user.

16. The method of claim 12, further comprising providing an indication to the user that the requested content is blocked.

* * * * *